United States Patent
Priddy

[11] 3,867,427
[45] Feb. 18, 1975

[54] PREPARATION OF PHENOLIC CARBOXYLIC ACID ESTERS

[75] Inventor: Duane B. Priddy, Midland, Mich.

[73] Assignee: The Dow Chemical Company, Midland, Mich.

[22] Filed: Sept. 11, 1972

[21] Appl. No.: 288,094

[52] U.S. Cl. .......................... 260/473 S, 260/473 F
[51] Int. Cl. ............................................ C07c 69/78
[58] Field of Search ................................ 260/473 S

[56] References Cited
OTHER PUBLICATIONS
Lindsey et al. Chem. Rev. Vol. 57, No. 4, (1957) pp. 583–592. March, "Advanced Organic Chemistry," McGraw Hill, (1968) pp. 316,584–590.

Primary Examiner—Lorraine A. Weinberger
Assistant Examiner—John F. Terapane
Attorney, Agent, or Firm—Chessie E. Rehberg

[57] ABSTRACT

Phenolic carboxylic acid esters are made by the reaction of an alkali metal phenate with the appropriate organic carbonate:

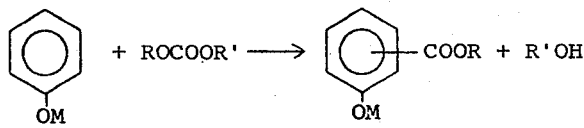

wherein M is an alkali metal and R and R' are hydrocarbyl radicals, preferably alkyl or aryl.

6 Claims, No Drawings

PREPARATION OF PHENOLIC CARBOXYLIC ACID ESTERS

BACKGROUND OF THE INVENTION

Heretofore the subject esters have been made by the esterification of the appropriate alcohol or phenol by reaction with the phenolic carboxylic acid. When a phenol is thus esterified there is, of course, a competitive reaction whereby the phenolic acid is self-esterified, thus producing a polyester resin.

SUMMARY OF THE INVENTION

According to the invention, esters of phenolic carboxylic acids are made by the reaction of an alkali metal phenate with an organic carbonate as illustrated by the equation

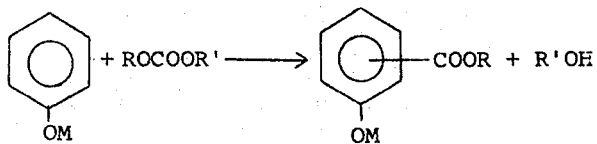

wherein M is an alkali metal and R and R' are hydrocarbyl radicals.

The reaction is suitably conducted in a polar, aprotic solvent, under anhydrous conditions and at a temperature of about 100°–225°C.

DETAILED DESCRIPTION OF THE INVENTION

The alkali metal phenate may be the salt of any of the alkali metals, though, as a practical matter, the sodium and potassium salts are preferred. The phenolic moiety of the phenate may be derived from phenol itself or a substituted phenol, provided that at least one o- or p-position is unsubstituted. Thus, it may be derived from phenol, a chlorinated or brominated phenol, an alkylphenol, a phenylphenol, a naphthol or the like.

The organic carbonate may be substantially any dialkyl, diaryl or aryl alkyl carbonate, including those having substituents that are inert in the process, such as alkyl substituents on an aryl nucleus. The aryl nuclei in such esters are preferably phenyl or lower alkylphenyl. The alkyl moieties of both the alkyl and the alkylphenyl esters are preferably lower alkyl, i.e., those having up to about 6 carbon atoms. Suitable such esters include dimethyl, diamyl, diphenyl, methyl phenyl, butyl benzyl, ethyl cresyl, dinaphthyl and allyl phenyl carbonates. As a general rule, when an alkyl aryl carbonate is used, the aryl moiety is displaced in the form of the corresponding phenol, leaving the alkyl ester as the primary product.

The solvent should be one that is inert in the process and at least partially dissolves the alkali metal phenate. Substantially any such solvent will also dissolve the other components of the reaction mixture. Suitable such solvents include dimethylformamide, dimethylsulfoxide, hexamethylphosphoramide and the like. In some instances an excess of the organic carbonate can serve as the solvent, or at least as a component thereof.

The proportions of the reactants are not critical and may be varied widely. There is no advantage to the use of excess alkali phenate. Excess carbonate may be useful as a solvent, though when another solvent is used it is usually preferred to use essentially the stoichiometric ratio of reactants.

While the temperature may be varied widely, it is usually preferred to conduct the reaction at about 150°–200°C.

The process is ordinarily conducted at atmospheric pressure unless the desired reaction temperature is above the boiling point of the reaction mixture, in which case an elevated pressure at least as high as the autogenous pressure is used.

The reaction time varies widely, depending on the particular reactants, the temperature, the degree of dilution, etc., being usually about 1–10 hr.

Upon completion of the reaction, the product can be isolated from the reaction mixture by any convenient means. Thus, the solvent, if any, the unreacted carbonate and the by-product alcohol or phenol can usually be removed by vacuum distillation, thus leaving the product in the salt form as a solid residue. This can be dissolved in water or aqueous alcohol and the solution acidified to convert the salt to the free phenolic product.

Alternatively, the entire reaction mixture can be mixed with water. The water dissolves the product salt. The unreacted carbonate and the by-product phenol or alcohol ($C_4$ or higher) can be extracted with ether, benzene or other solvent, leaving the product salt in the aqueous phase. Acidification of the latter liberates the phenolic ester product, which can then be separated or extracted with a water-immiscible solvent, such as ether or benzene.

SPECIFIC EMBODIMENTS OF THE INVENTION

The practice of the invention is illustrated by the following examples.

Example 1

Preparation of Phenyl p-Hydroxybenzoate

Anhydrous potassium phenolate (13.4 g., 0.1 mole) and diphenyl carbonate (21.4 g., 0.1 mole) were heated at 150°C. for 5 hours in 100 ml. of dry dimethyl sulfoxide under a nitrogen atmosphere. The mixture was then poured into 300 ml. of cold water and extracted with ether. The ether extract was evaporated to give 15 g. of phenol. The aqueous layer was acidified with concentrated hydrochloric acid and extracted with ether. The ether extract was evaporated to give 15 g. of an oily solid. Recrystallization of the crude material from chloroform-hexane gave 11.6 g. (54.2%) of light tan crystals, m.p. 176–179°.

Example 2

Preparation of Phenyl p-Hydroxybenzoate

Anhydrous sodium phenolate (11.6 g., 0.1 mole) and diphenyl carbonate (21.4 g., 0.1 mole) were heated at 150° for 5 hours in 100 ml. of dry dimethyl formamide under a nitrogen atmosphere. The mixture was then poured into 300 ml. of cold water and extracted with ether. The ether extract was evaporated to give 15 g. of phenol. The aqueous layer was acidified with concentrated hydrochloric acid and extracted with ether. The ether extract was evaporated to give 15 g. of oil. After standing for several hours, tan crystals were deposited. These crystals were separated by filtration and washed with hexane to give 1.6 g. (7.6%) tan crystals, m.p. 175°–179°.

Example 3

Preparation of Ethyl o- and p-Hydroxybenzoate

Anhydrous potassium phenolate (13.4 g., 0.1 mole) and ethyl phenyl carbonate (16.6 g., 0.1 mole) were heated at 150°C. for 5 hours in 100 ml. of dry dimethyl sulfoxide under a nitrogen atmosphere. The mixture was poured into 300 ml. of cold water, acidified with concentrated hydrochloric acid and extracted with ether. The ether extract was evaporated to give 25 g. of an oil which contained a mixture of ethyl p-hydroxybenzoate and ethyl salicylate.

I claim:

1. The process of making an ester of a phenolic carboxylic acid comprising reacting by contacting at about 100°– 225°C. in a polar aprotic solvent selected from the group consisting of dimethylformamide, dimethylsulfoxide and hexamethylphosphoramide under substantially anhydrous conditions an alkali metal phenate having at least one unsubstituted ortho or para position and selected from the group consisting of those derived from phenol, chlorinated phenols, brominated phenols, alkylphenols and phenylphenol with an organic carbonate of the formula ROCOOR', wherein R and R' are alkyl or aryl hydrocarbyl radicals.

2. The process of claim 1 wherein the reaction temperature is about 150°–200°C.

3. The process of claim 1 wherein the alkyl radicals contain not more than six carbon atoms and the aryl radicals are phenyl radicals.

4. The process of claim 1 wherein the alkali metal is sodium or potassium.

5. The process of claim 3 wherein the alkali metal is sodium or potassium, the reaction temperature is about 150°–200°C.

6. The process of claim 5 wherein the organic carbonate is diphenyl, ethyl phenyl, dimethyl, diamyl, methyl phenyl, butyl benzyl, ethyl cresyl, or dinaphthyl carbonate and the phenate is the sodium or potassium salt of phenol, alkylphenol, phenylphenol, chlorophenol or bromophenol.

* * * * *

UNITED STATES PATENT OFFICE
CERTIFICATE OF CORRECTION

PATENT NO. : 3,867,427
DATED : February 18, 1975
INVENTOR(S) : D. B. Priddy

It is certified that error appears in the above-identified patent and that said Letters Patent are hereby corrected as shown below:

On Title Page under References Cited, Other Publications, please insert:

Hirao et al. C.A. 71 38535g (1969)

Kito et al. C.A. 73 45067a (1970)

Hemtschel, J. Prakt. Chem. [2] 27 39 (1883)

Hirao et al., Kogyo Kagaku Zasshi 72 (3) 692-5 (1969)

Kito et al. Kogyo Kagaku Zishi 73 (4) 742-5 (1970)

Lindsey et al, Chem. Rev. 57 (4) 594-595 (1957)

Lindsey et al., Chem. Rev. 57 (4) 583-592 (1957)

March, "Advanced Organic Chemistry, McGraw Hill (1968) pp 316, 584-590

Signed and Sealed this twenty-ninth Day of July 1975

[SEAL]

Attest:

RUTH C. MASON
Attesting Officer

C. MARSHALL DANN
Commissioner of Patents and Trademarks